(12) United States Patent
Matzkel et al.

(10) Patent No.: US 9,721,119 B2
(45) Date of Patent: Aug. 1, 2017

(54) SYSTEM AND METHOD FOR SECURE USE OF MESSAGING SYSTEMS

(71) Applicant: Vaultive Ltd., Tel Aviv (IL)

(72) Inventors: Ben Matzkel, Givatayim (IL); Maayan Tal, Nir-Tzvi (IL); Aviad Lahav, Tel-Aviv (IL)

(73) Assignee: VAULTIVE LTD., Tel Aviv (IL)

( * ) Notice: Subject to any disclaimer, the term of this patent is extended or adjusted under 35 U.S.C. 154(b) by 0 days.

(21) Appl. No.: 14/857,260

(22) Filed: Sep. 17, 2015

(65) Prior Publication Data
US 2016/0004883 A1 Jan. 7, 2016

Related U.S. Application Data

(63) Continuation of application No. 13/699,019, filed as application No. PCT/IL2011/000397 on May 19, 2011, now abandoned.
(Continued)

(51) Int. Cl.
*G06F 15/16* (2006.01)
*G06F 21/62* (2013.01)
(Continued)

(52) U.S. Cl.
CPC .......... *G06F 21/6245* (2013.01); *H04L 12/58* (2013.01); *H04L 51/14* (2013.01);
(Continued)

(58) Field of Classification Search
CPC ..... G06F 21/6245; G06F 21/62; H04L 12/58; H04L 63/0428; H04L 51/14; H04L 63/0471; H04L 63/123
See application file for complete search history.

(56) References Cited

U.S. PATENT DOCUMENTS 5,761,306 A * 6/1998 Lewis ............... G06Q 20/3829
380/282
7,877,594 B1 * 1/2011 DiSanto ................. H04L 12/58
713/152
(Continued)

FOREIGN PATENT DOCUMENTS

JP 4-199270 7/1992
JP 2004-206439 7/2004
(Continued)

OTHER PUBLICATIONS

A.S. Tanenbaum, Computer Networks (Third Edition), Pearson Education, May 20, 1999, pp. 543-545 (English version in reference P, pp. 568-570).
(Continued)

*Primary Examiner* — Cheikh Ndiaye
(74) *Attorney, Agent, or Firm* — Pearl Cohen Zedek Latzer Baratz LLP

(57) ABSTRACT

A system and method for secure use of messaging systems. A mediator may receive an original message, process the original message to produce a processed message, and may forward the processed message to a server or a messaging system. A mediator may receive a processed message from a server or a messaging system, process the received processed message to produce an unprocessed message that may be substantially identical to the original message and may forward the unprocessed message to a destination.

27 Claims, 5 Drawing Sheets

Related U.S. Application Data

(60) Provisional application No. 61/347,229, filed on May 21, 2010.

(51) Int. Cl.
*H04L 12/58* (2006.01)
*H04L 29/06* (2006.01)

(52) U.S. Cl.
CPC ...... *H04L 63/0428* (2013.01); *H04L 63/0471* (2013.01); *H04L 63/123* (2013.01)

(56) References Cited

U.S. PATENT DOCUMENTS

| | | | |
|---|---|---|---|
| 2005/0198170 A1 | 9/2005 | LeMay et al. | |
| 2006/0064581 A1 | 3/2006 | Miller et al. | |
| 2006/0101285 A1 | 5/2006 | Chen et al. | |
| 2007/0005713 A1* | 1/2007 | LeVasseur | H04L 63/306 709/206 |
| 2007/0130069 A1 | 6/2007 | Kay et al. | |
| 2007/0276958 A1* | 11/2007 | Curtis | H04L 63/0272 709/238 |
| 2009/0150675 A1 | 6/2009 | Cook | |
| 2010/0077205 A1* | 3/2010 | Ekstrom | H04L 63/0428 713/153 |
| 2010/0217984 A1* | 8/2010 | Hill | G06Q 10/107 713/168 |
| 2011/0202756 A1 | 8/2011 | West | |
| 2012/0023570 A1* | 1/2012 | Gorodyansky | H04L 63/0407 726/12 |

FOREIGN PATENT DOCUMENTS

| | | |
|---|---|---|
| JP | 2005-107935 | 4/2005 |
| JP | 2007-52698 | 3/2007 |
| JP | 2009-37346 | 2/2009 |
| JP | 2012-502311 | 1/2012 |
| WO | WO 2010/026561 | 3/2010 |

OTHER PUBLICATIONS

A.S. Tanenbaum, Computer Networks (Fourth Edition), Pearson Education, Aug. 9, 2002, pp. 1-673.
Office Action issued by the Japanese Patent Office for Application No. 2013-511787 dated Apr. 28, 2015.
International Search Report and Written Opinion for PCT International Application No. PCT/IL2011/000397 dated Aug. 3, 2011.
Office Action issued by the United States Patent and Trademark Office for U.S. Appl. No. 13/699,019 dated Oct. 8, 2014.
Office Action issued by the United States Patent and Trademark Office for U.S. Appl. No. 13/699,019 dated Mar. 18, 2015.

* cited by examiner

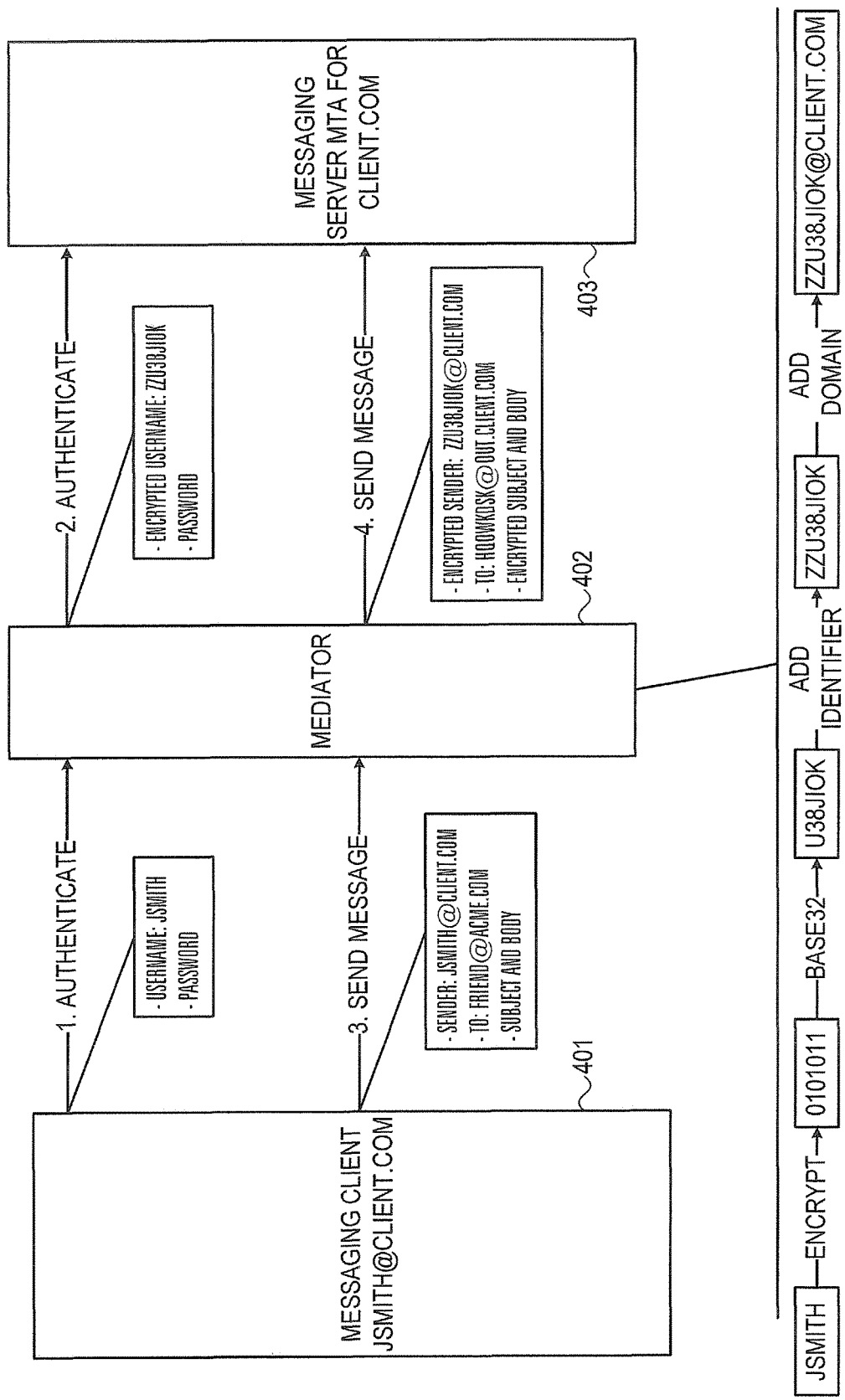

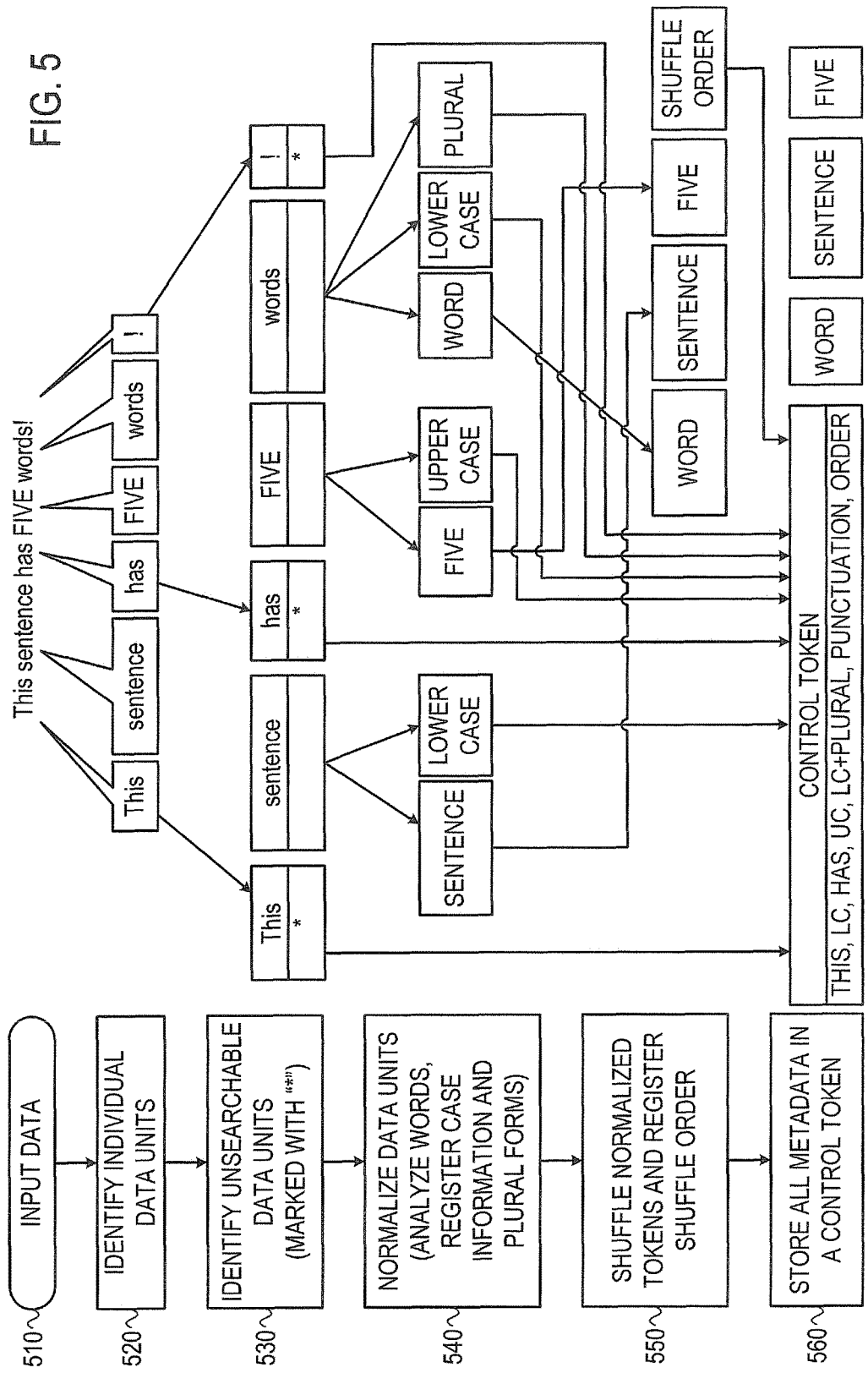

SYSTEM AND METHOD FOR SECURE USE OF MESSAGING SYSTEMS

CROSS-REFERENCE TO RELATED APPLICATIONS

This application is a continuation application of U.S. patent application Ser. No. 13/699,019 filed Nov. 20, 2012 and published on Mar. 14, 2013 as US Patent Application Publication No. US 2013/0067012, which is a National Phase Application of PCT International Patent Application No. PCT/IL2011/000397, International Filing Date May 19, 2011, entitled "SYSTEM AND METHOD FOR SECURE USE OF MESSAGING SYSTEMS", published on Nov. 24, 2011 as International Patent Publication No. WO 2011/145097, which claims priority from U.S. Provisional Patent Application No. 61/347,229, filed May 21, 2010, both of which are incorporated herein by reference in their entireties.

BACKGROUND OF THE INVENTION

Electronic Mail is one of the most common communication forms. The Internet and the World Wide Web has made Electronic Mail a widespread application in use by numerous individuals and organizations. In the basic e-mail model, a user accesses an e-mail server using a network communication protocols, can retrieve messages waiting for him or her, and can send new messages to one or more intended recipients. Several e-mail vendors offer additional functionality on top of this basic function, such as managing contacts, filtering and categorizing emails, etc.

There are many e-mail vendors who provide e-mail services in the Internet, rather than distribute the software for operating an e-mail server. Prominent examples include Google®'s Gmail™ service, Hotmail™ and also many smaller Internet Service Providers (ISPs). In such Internet-hosted services, users' messages and other data are stored on the email provider's servers. Some organizations and individuals concerned of their privacy are reluctant to use such hosted services, as users' data and messages are trusted to a third party—the email provider.

Electronic mail is a global and open system. Every email provider is registered for one or more e-mail domains. E-mail addresses always include this e-mail domain. When an e-mail message needs to be delivered to its recipient, the global e-mail domain registry is consulted in order to find the server handling this domain; then the message is sent to that server; the server stores the message; and later the recipient retrieves the message from the server. The global registry of e-mail domains is operated using the global Domain Name System (DNS), in which records known as MX records are registered by providers. An MX record of an email domain points to a server handling incoming messages for that domain.

Email providers typically emphasize their taking of security measures to protect users' data. Such measures include protecting the communications between the user and the provider by encrypting the network traffic, strong security policies enforced in the provider's data centers, auditing and similar methods. However, all these measures do not eliminate the basic concern of putting a user's data in the hands of another party.

SUMMARY OF EMBODIMENTS OF THE INVENTION

Embodiments of the invention may enable secure use of messaging systems. A system for securing messages may include a mediator that may receive an original message, process the original message to produce a processed message, wherein the processing includes transforming at least a portion of the original message, and forward the processed message to a server or a messaging system. A mediator may receive a processed message from a server or a messaging system, process the received processed message to produce an unprocessed message that may be substantially identical to the original message and may forward the unprocessed message to a destination. Processing a message may include encrypting or obfuscating any portion of a message including a sender and/or a recipient address or name, a domain and/or a body of the message. A mediator may mediate requests and/or queries related to processed messages stored on a messaging system.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 4 schematically shows a flow according to embodiments of the invention; and FIG. 5 illustrates an exemplary method of encryption according to embodiments of the invention.

Figure 1:
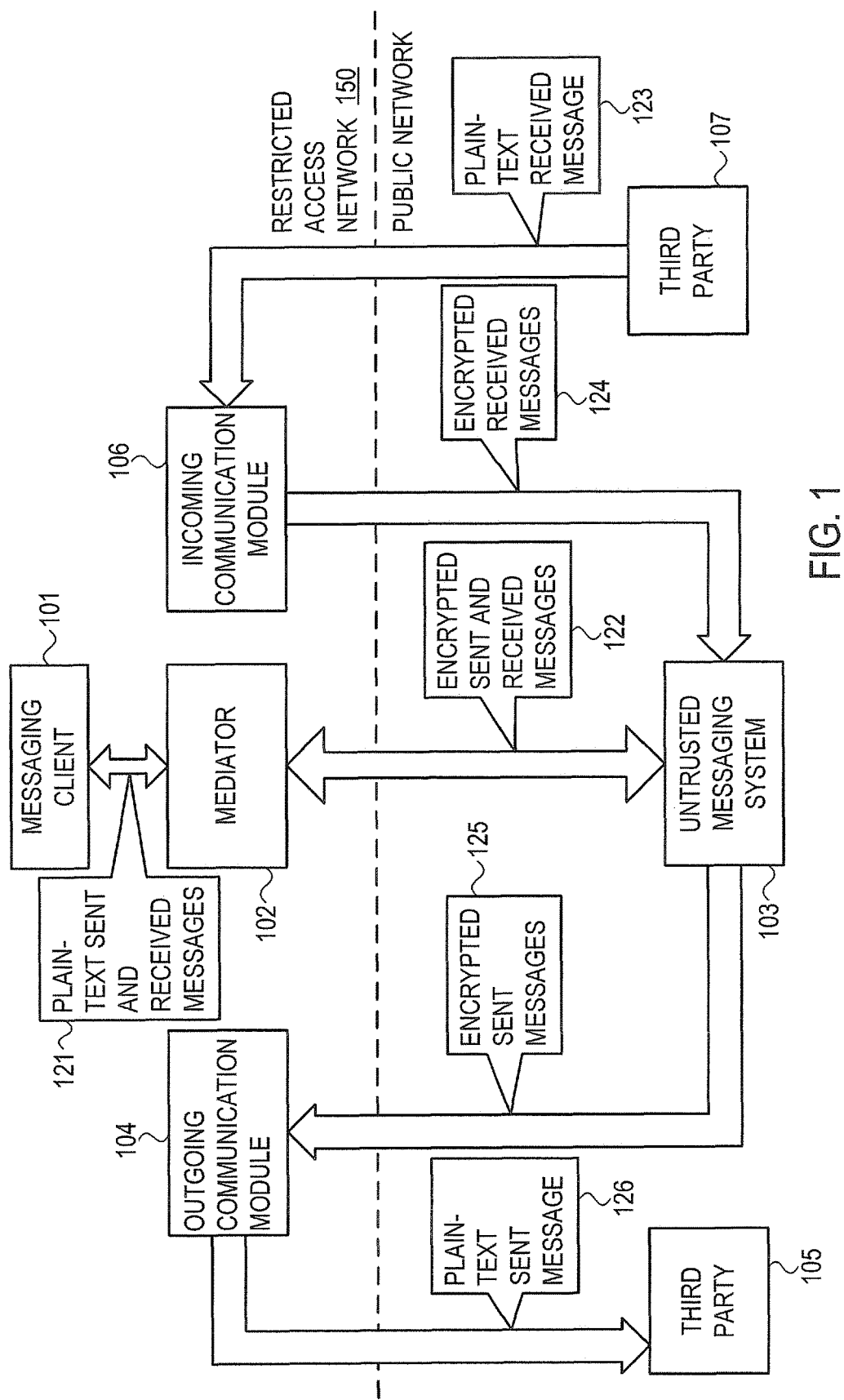
FIG. 1 shows a schematic block diagram of a system according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. For example, a mediator may be such article.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The present invention enables solving the trust problem discussed above by addressing its root cause: the trust that a user must have towards an email provider. The invention enables users to use remote e-mail service providers without exposing the content and/or recipients of their messages to the service provider. In addition to email systems, the present invention has applicability to messaging systems which need not be electronic in nature. The invention can make in-bound and out-bound message interception for content securing for any messaging system.

The present invention includes a messaging client portion, a messaging server portion, and a mediator adapted to intercept and modify communications between the messaging client portion and the messaging server portion. Optionally, the invention also includes one or more outgoing communication modules adapted to receiving messages sent to a third party after leaving the server portion and before reaching a third party. Optionally, the invention also includes one or more incoming communication modules adapted to receiving messages from a third party before reaching the server portion.

The client portion may be a human user, a computer agent being used by a person or an automatic agent operating on behalf of a person. The client may access the server, may send a message or messages retrieve request, may send a message or messages send request, and may request any other operations. The mediator may be adapted to receiving requests from the user intended for the server, processing requests to produce processed requests, and forwarding the processed requests to the messaging server. The processing of a message (e.g., associated with a message send request) may include detecting message parts such as message subject, message body, message attachments, message recipient address or addresses, message author address or addresses, and other message parts. Processing of a message (e.g., an original message received from a client) may include encrypting all or a portion of the original message. For example, portions of a message that may be encrypted or otherwise processed may be a recipient address, a sender address, a subject associated with the message, an attachment, a message header and/or a body of the message. Processing a message may include processing message portions, parts or elements jointly or separately to provide a processed message composed of processed message elements.

A mediator may include two portions, a first portion adapted to receiving requests from a client, and a second portion adapted to receiving responses from the server. A mediator that may receive an original message from a client, process the original message to produce a processed message and forward the processed message to a server may be referred to herein as a forward mediator. A mediator that may receive a processed message from a server, process the received processed message to produce an unprocessed message, e.g., such that the unprocessed message may be substantially identical to an original message, and forward the unprocessed message, e.g., to a client may be referred to herein as a reverse mediator.

In an embodiment of the present invention, the processing performed at the mediator, incoming communication module and outgoing communication module may include encrypting incoming and outgoing messages before they are received by the messaging server, and decrypting messages before they are received by either a user of the system or a third party recipient of a message authored by the user. Thus an email provider is able to provide an email messaging service without gaining access to a user's data, and users are able to work with an untrusted email provider. An embodiment of the present invention may secure communication of information over various network protocols simultaneously, including SMTP, POP3, IMAP, MAPI, Web-based access to mail services such as Gmail, etc.

Reference is made to FIG. 1 that shows a schematic block diagram of a system and flows according to embodiments of the invention. As shown by FIG. 1, an embodiment of the invention may include both an outgoing communication module, an incoming communication module and a mediator. The incoming and outgoing communication modules and the mediator may be implemented as network nodes, or attached to, or incorporated in a computing device, e.g., a user's computer or a server. The incoming and outgoing communication modules and the mediator may be separate units or devices or they may be combined into a one or more units. A messaging client 101 may access a messaging server 103 with the mediator 102 mediating communication of information, data and/or parameters between the messaging client and the server. For example, some or all information communicated between the messaging client and the server may be routed through, or intercepted by, a mediator. It will be understood that a various setups, systems or configurations may be possible. For example, a single mediator may include both an incoming and an outgoing communication module. An incoming communication module may function as a forward mediator.

The messaging client may send and receive messages in clear-text (121), and the messaging client receives and sends these messages encrypted (122). When a third party 107 sends a message (123) to the client, it may first be received by the incoming communication module 106, then the incoming communication module may encrypt the message and may send it encrypted (124) to the messaging server. The encrypted message may be stored in the messaging server. Later, when the client accesses the messaging server using the mediator, the encrypted message may be decrypted before being received at the client. In another case, when the client is sending a message to a second third party 105, the message may be encrypted when sent to the messaging server, stored there encrypted in the user's outbox, then sent encrypted (125) to the outgoing communication module 104, decrypted and sent in plain-text (126) to the second third party (105). The client, mediator, incoming communication module and outgoing communication module may be located at a restricted-access network 150 such as the organization's private network, and thus may be able to apply encryption and decryption using encryption keys available only in the restricted-access network.

An embodiment of the present invention may include an outgoing communication module functioning as a reverse mediator. When an outgoing communication module exists, the mediator may process one or more recipients in a message send request to provide one or more processed recipients. The processed recipients may be constructed such that the message will be received at an outgoing communication module after being sent from the messaging server to the processed recipient address. The processing of an intended recipient may include at least one of (a) encrypting the recipient address, (b) adding identification information to the processed recipient in order to assist interception or detection of a processed recipient in a body of text, (c) adding context information indicating the context in which the processing has taken place, (d) encoding the processed recipient such that it is not rejected by the email server, (e) adding address destination information to indicate to the email server how to access an outgoing communication module for delivery of the message, (f) breaking up the original address to provide searchable terms within the address, then adding encrypted forms of the searchable terms to the processed recipient, (g) any other processing modifying the intended recipient.

Optionally, to increase security of information related to the intended recipients, processing of the intended recipients may include at least one of (a) producing one or more processed recipients from one or more intended recipients, (b) generating fake recipient addresses that can be identified as fake by an outgoing communication module but not necessarily by other parties, (c) placing processed recipients in another message part such as the message body or subject, (d) changing the location or role of an intended recipient, for example removing all intended recipients from an email "cc" or "bcc" recipient list and putting them all in the "to" recipient list. Any modifications to a header or metadata of a message may be performed. For example, recipient addresses may be modified, removed, replaced or added.

Figure 2:
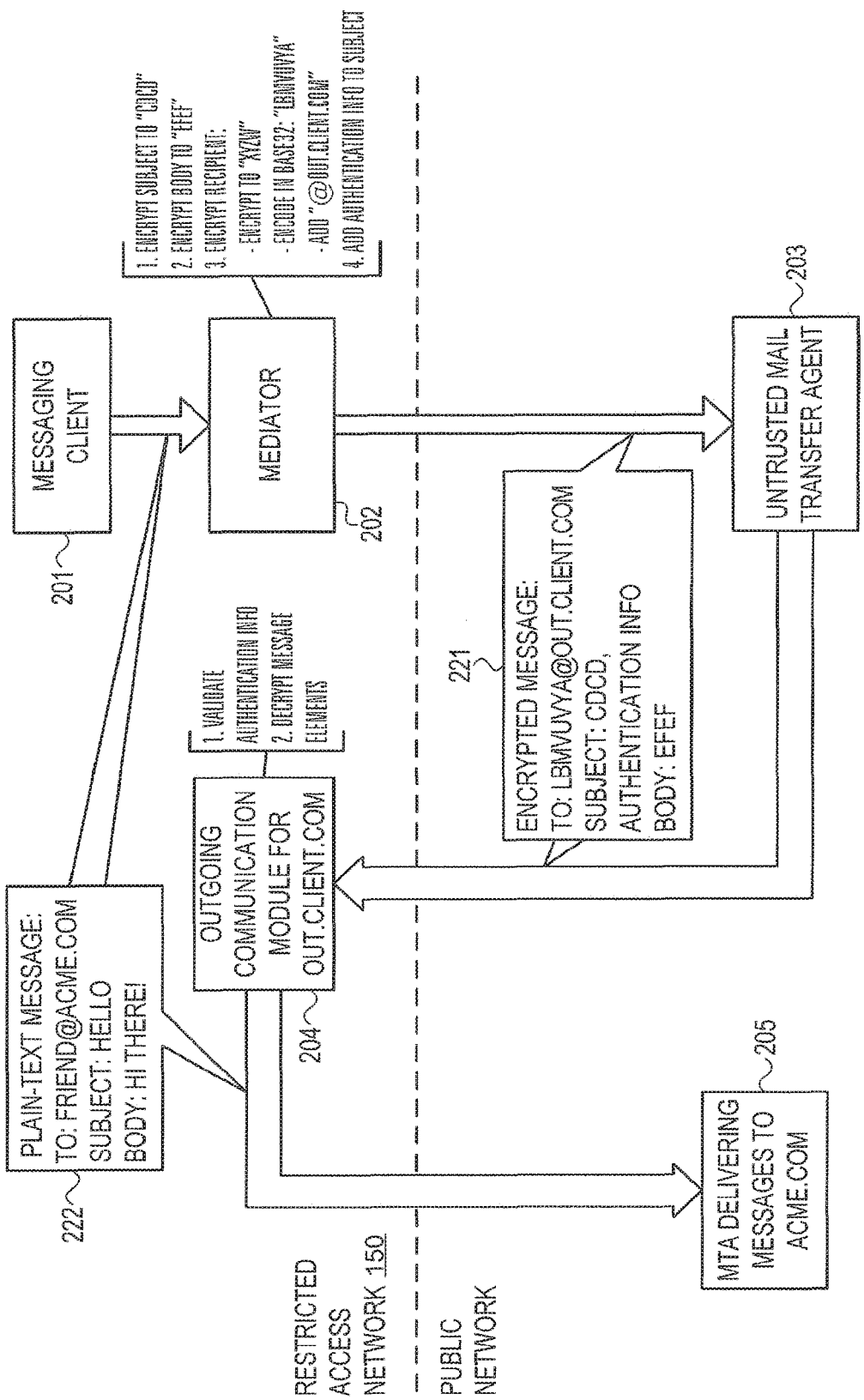
FIG. 2 shows a schematic block diagram of a system according to embodiments of the invention.

Reference is made to FIG. 2 that shows a schematic block diagram of a system and flows according to embodiments of the invention. FIG. 2 illustrates how an outgoing email message may be processed by an embodiment of the present invention in an email messaging system. The outgoing communication module 204 may be registered for delivering messages of a unique or specific email domain "out.client.com", using a DNS MX registration. When the mediator 202 processes a recipient of an email message 222 received from the client 201, it may: (1) encrypt the message recipient, subject and body, (2) encode the encrypted recipient in Base-32 encoding, (3) add an at-sign ("@") to the encoded recipient, (4) add the unique email domain registered for an outgoing communication module, (5) add authentication information to the outgoing message.

Later, when the email server 203 tries to deliver the processed message 221 to the processed recipient, the message will reach an outgoing communication module 204 as the email domain of the processed recipient is handled by the outgoing communication module. The outgoing communication module may proceed to process the processed message, providing a re-produced 222 message and may forward the re-produced message to the originally unprocessed intended recipient using the recipient's MTA 205.

Optionally, the mediator includes in the processed message authentication information to be validated by an outgoing communication module. The outgoing communication module may thus able to validate the authenticity of a processed message, and may refuse to process any un-authenticated messages. The authentication information may include an encryption time indication or a time expiration indication to indicate the time for which the authentication information is valid. The authentication information may be digitally signed or encrypted to provide confidentiality or tampering resistance.

The present invention may include one or more incoming communication modules adapted to receiving messages from a third party intended for a user of the system. An incoming module may process an original incoming message to provide a processed message, and then forward the processed message to the messaging server. In order for incoming messages to be received at an incoming communication module, an outgoing communication module may modify the sender address or reply-to address in the outgoing message such that any reply will be received at an incoming communication module. The incoming communication module may be registered at the messaging system's address registry, and an outgoing communication module may produce a processed sender address handled by an incoming communication module.

For example, if the original sender address of an email message is "sender@mail.com", an outgoing communication module may change it to "sender@incoming mail.com", and an incoming communication module may be registered at the DNS system to process messages for the domain "incoming mail.com".

Figure 3:
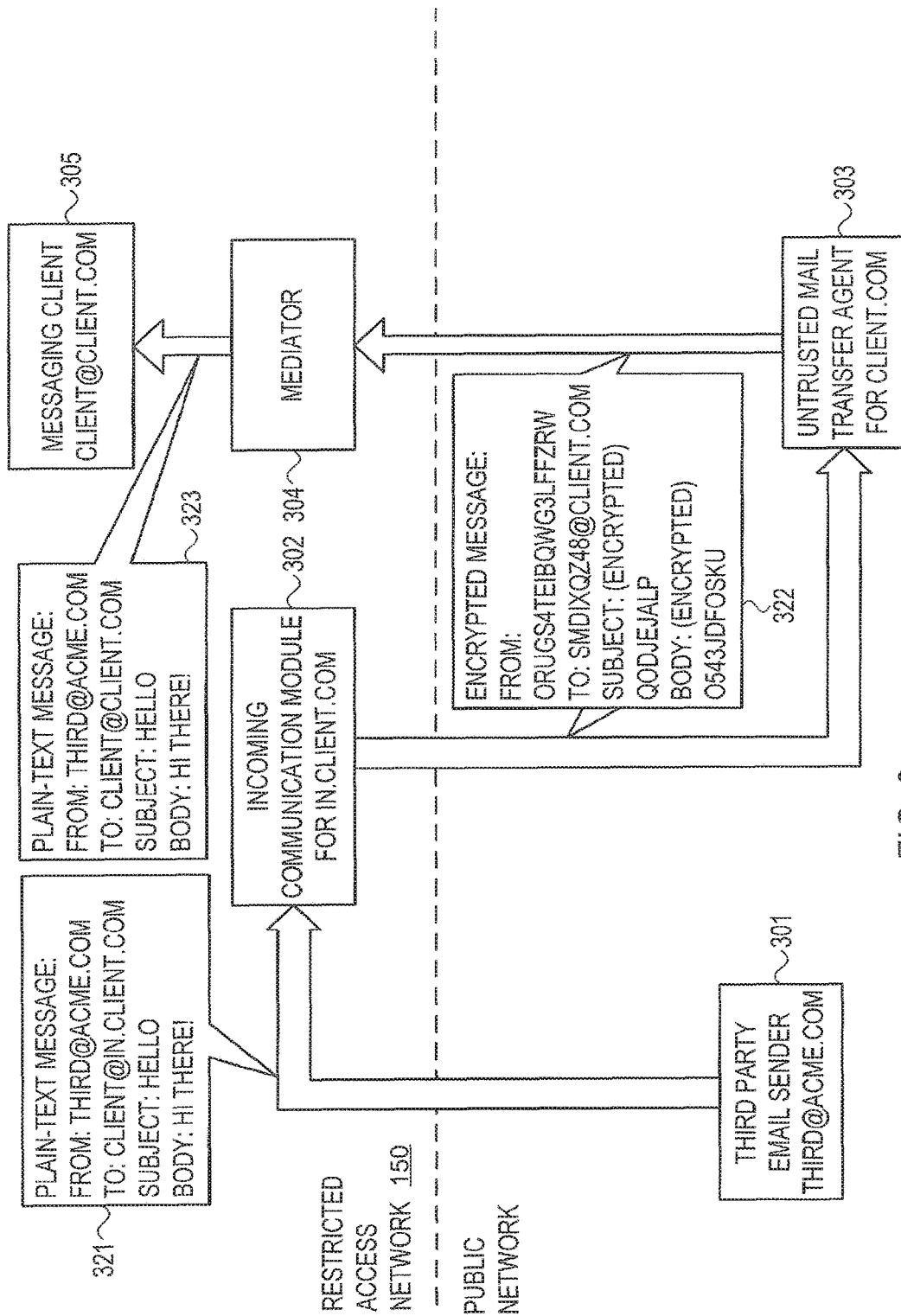
FIG. 3 shows a schematic block diagram of a system according to embodiments of the invention.

Reference is made to FIG. 3 that shows a schematic block diagram of a system and flows according to embodiments of the invention. Generally, FIG. 3 illustrates how an embodiment of the invention processes incoming messages. When a third party email user 301 sends an email message 321 to the client 305, the message may first be received and processed at the incoming communication module 302. The incoming communication module may encrypt the message's body, subject, sender address, and recipient. The recipient may further be encoded in Base-32, and the email domain "@client.com" may be appended to the processed message 322. The processed message may then be received by the client's untrusted MTA 303, which may store the encrypted message and may make it available for the client for later retrieval. When the client 305 eventually retrieves the message, the message may be decrypted at the mediator 304 before being received at the client.

To provide additional security by hiding the identity of the user, the system may process one or more sender addresses in at least one of (a) sender addresses occurring in message send requests made by the client and received at the mediator before being received at the messaging server, (b) user names for authentication to a messaging server received at the mediator before being received at the messaging server, (c) sender addresses occurring in outgoing messages, received at an outgoing communication module, (d) recipient address of an incoming message, received at an incoming communication module, (e) anywhere where a user name may occur.

Some messaging servers require a client to authenticate to a messaging server before requesting any further requests, including message send requests. Some of these authenticating messaging servers may also require the sender address in message send requests to be validated against the authentication credentials received from a client. In such cases, the system may process user names and sender address such that the processed user names and sender addresses do not cause requests to be rejected by the messaging server. For example, processed user names and sender addresses may be generated such that they adhere with a rule, criteria, format or any requirement dictated by the messaging server.

In the mediator, processing of user names occurring in sender addresses to provide processed user names may include at least one of (a) encrypting the one or more user names using a symmetric cipher and a private key, (b) adding identification information to the processed one or more user names in order to assist interception or detection of a processed one or more addresses in a body of text, (c) adding context information indicating the context in which the processing has taken place, (d) encoding the processed one or more user names such that it is not rejected by a messaging application in the messaging system, (e) maintaining a fixed mapping between original user names and processed user names, and replacing an original sender addresses with a matching processed sender address using this mapping, (f) any other processing modifying the original one or more sender address.

Optionally, the processing of sender addresses and user names in the mediator may include processing an indication of registered handler for messages, such as an email domain in email messages. When an indicated handler for messages is the incoming communications module, the mediator may replace it with the indicated handler which is the messaging server, such that the messaging server is not aware of an incoming communication module. In an incoming communication module, processing of recipient addresses may include any processing applied in the mediator to sender addresses.

In an outgoing communication module, processing of sender addresses occurring in outgoing messages may include (a) validation that the sender address has been previously received and processed by the mediator, (b) modifying a part of a sender address indicating a registered handler for incoming messages (e.g. the email domain in email addresses) to indicate that the handler is an incoming communication module, (c) decrypting a user name occurring in sender addresses, (d) using a fixed mapping between original user names and processed user names to retrieve an original user name, (e) removing identification information added to a user name or sender address, (f) removing context information added to a user name or sender address, (g) decoding encoded user names or sender addresses, (h) any other processing needed to recover an original sender address or user name occurring in a sender address from user names or sender addresses previously processed at the mediator or at an incoming communication module.

Reference is made to FIG. 4 that shows a flow according to embodiments of the invention. FIG. 4 illustrates possible processing of email addresses in an embodiment of the invention securing email communications. In this example, the email server compares the authenticated user name to the user name part of an email address and may reject a message send request if the two user names are not equal. Here, if the original sender 401 of an email message is "jsmith@client.com", the user name in an authentication request is "jsmith", and the messaging server requires a user name received in an authentication request to match the user-name part of a sender address received in a message send request, then: (1) the processed sender address may be "ZZu38jiok@client.com", (2) the processed user name in an authentication request may be "ZZu38jiok", (3) the email MTA 403 may check the sender against the user name and the sent message may thus be accepted by the MTA 403 and may be processed normally. Inside the mediator 402, sender addresses and user names may be processed by (1) encrypting, (2) encoding in base-32, (3) adding a rare identifier such as "ZZ", (4) Add the client's email domain—e.g., when required by the server.

The system may encrypt outgoing messages as part of their processing in the mediator, such that messages send requests received at the messaging server are encrypted. Encryption of messages may combine several message elements such as message body, subject, sender, recipient or attachments and encrypt them together or separately. Encryption may be performed using a symmetric cipher using a key known only to the mediator, an incoming communication module, or an outgoing communication module. The system may encrypt messages as part of their processing in the incoming communication module, such that incoming messages received at the messaging server are encrypted.

Some servers enable users to search through sent and received messages for specific search terms. To support searching of encrypted messages, the mediator or an incoming communication module may identify searchable terms within the message subject, body, attachments or other message elements, then encrypt theses searchable terms individually. Searchable terms may be encrypted individually and/or deterministically, such that an encrypted searchable term is always equivalent to other encrypted searchable terms when the original searchable terms are equivalent. Processing a request related to a message may be based on, or according to, the processing of the message. For example, the same encryption key or scheme used to encrypt searchable or other terms in a message may be used to encrypt searchable or other terms in a subsequent search request related to the message.

The system may process search requests in the mediator before such a search request is received by the messaging server. The mediator may encrypt every individual search term occurring in the search request in the same way searchable terms within processed message elements are encrypted, using the same secret key or mapping. Optionally, encryption of searchable message elements may separate searchable information from un-searchable information, and un-searchable information may be encrypted separately from individual searchable terms. Un-searchable information may include (a) non-letter textual characters, such as punctuation marks and space characters, (b) upper case or lower case variations in letters, (c) diacritics added or removed from letter variants, such as "café" vs. "cafe", (d) a set of predefined words marked as unsearchable, for example the words "this", "that", "a" may be marked unsearchable, (e) variations in word boundary determination, such as the distinction between "white board" and "whiteboard", (f) variations in the morphological form of a base word, such as the distinction between "send" and "sending". The encrypted un-searchable information need not be deterministic, and may use cryptographic salt for encryption. The process of removing un-searchable information from individual words or text segments is herein referred to as normalization. An individual word or text segment included in the original message may be herein referred to as an original term or an original search term. The set of predefined words may include all words of certain length or lengths.

Optionally, encryption and decryption of searchable terms may be performed by maintaining a mapping between encrypted and decrypted terms, instead of using a cipher and a private key. The mapping may be secret and known only to the mediator, incoming communication module and outgoing communication modules. The mapping may include using a non-reversible keyed security transformation. Optionally, encryption and decryption of searchable terms may be performed by a combination of maintaining a mapping and encrypting with a symmetric cipher and a private key. Optionally, e.g., in order to increase the resistance to statistical cryptographic analysis, the order of encrypted searchable terms may be changed, with the original order encrypted separately or jointly with the un-searchable information.

Optionally, e.g., in order to increase the resistance to statistical cryptographic analysis, fake encrypted searchable terms may be added to encrypted searchable terms. The indication of fake searchable terms will also be encrypted. Further, fake encrypted searchable terms may be produced in a statistical distribution that matches a statistical distribution of non-fake text bodies, such that it is not easy to defer which search terms are fake and/or which are not from a statistical analysis of an encrypted text. Optionally, to increase the resistance to statistical cryptographic analysis, fake encrypted terms copied from real encrypted terms may be added to encrypted searchable terms, and real words occurring more than once in the original text may have only one encrypted word in the processed text. Thus, it may be difficult for an attacker injecting a specific word to the system multiple times to determine which of the fake words the encrypted form of the injected word is.

To make the system more secure to statistical attacks while enabling searching through text, the mediator or incoming communication module may encrypt the an entire textual input, such as the message body or the message subject, in a single encrypted bulk (e.g., without determining word boundaries or performing other segmentation). Then, to enable searching, an encrypted form of every word appearing in the input may be included in the processed text, in an arbitrary order. Further, additional fake words may be added to the processed text.

Reference is made to FIG. 5 that illustrates an exemplary method of encryption according to embodiments of the invention. FIG. 5 illustrates an exemplary encryption of a sentence in a searchable form, e.g., as described in detail above. Encryption proceeds in several steps. As shown by 510, input data may be received, for example, input data may be any portion of an original message, e.g., an e-mail message, including a message body, metadata, information in a header of a message etc.

As shown by 520, individual data units may be identified, for example, input text may be broken up into a sequence of text segments. As shown by 530, unsearchable data units may be identified and/or marked, for example, text segments may be selected for searchable encryption, e.g. a segment may be classified as a word, a word may be included in a group of searchable or un-searchable words, a word may be excluded from the group of candidates based on its length, etc.

As shown by 540, data units may be normalized, for example, text segments selected for searchable encryption may be normalized, e.g. by converting all letters to lower case, by converting letters with diacritics to letters without diacritics, by converting words to morphologically equivalent variants such as converting plural forms into singular forms, a combination of such methods, etc. Fourth, the order of text segments selected for searchable encryption may be changed. As shown by 550, normalized tokens may be shuffled and the shuffle order (or another parameter related to the shuffling of tokens) may be recorded, e.g., such that an original order may be restored. For example, information including un-searchable segments and possibly searchable segments may be arranged in at least one un-searchable tokens, also referred to herein as control tokens, and segments selected for searchable encryption may be arranged in at least one secured search terms. As shown by 560, a control token may be generated and/or used to record any parameter related to any of the operations in the flow. For example, metadata or parameters related to conversions applied to data (e.g., a transformation and/or shuffle of terms) may be stored in a control token. The control token may be encrypted using a secret key. A secured search term may be encrypted or may be transformed using a one-way keyed security transformation such as a cryptographic hash function, a cryptographic Message Authentication Code (MAC), etc.

The system may encrypt searchable message text elements such as message subject and body produced encrypted forms different from encrypted forms of addresses and contacts. For example, encrypted forms of email addresses may use only lower case ASCII characters for encoding email addresses, and encrypted forms of searchable words may use both upper case and lower case letters. Optionally, to support searching of all encrypted forms, the system may process search requests to provide processed search requests, where any possible encrypted form of a search term is added in the search request. The possible encrypted forms are added to the search request in a way that the messaging server understands that the relation between the searchable terms is a logical disjunction relation (also called an "OR" relation).

Optionally, to support searching of encrypted forms in sender and recipient addresses, the system may add to the processed address a searchable form of every searchable term in an input address, when the format of a processed address allows this adding. For example, some email servers allow a display-name to be added to email address in the form "MyName" <myuser@mymail.com>. The mediator or incoming communication module may add an encrypted form of searchable terms occurring in an email address such as "myuser" and "myemail" to the display-name part of the email address, thus providing "MyName-encrypted myuser-encrypted myname-encrypted" <myuser-mymail-com-alternate-form-encrypted>@mail.com".

Since incoming messages sent from a third party to a user of the system may be encrypted without the third party authentication to the system, this could become a security risk, assisting an attacker to obtain encrypted forms of specific words if the attacker gains access to the user's account in a messaging server. Optionally, the incoming communication module may encrypt incoming messages in an un-searchable, non-deterministic form, such that multiple injection attempts do not provide an attacker with repeated encrypted forms, and not assisting in building a mapping between encrypted and plain-text forms of specific injected words. The system may later detect that the incoming message was sent from a legitimate user by at least one of (a) recognizing a message sent from the user to that user, (b) the user explicitly indicating the sender to the system as a legitimate user, (c) other heuristic or statistical analysis proving that the sender is legitimate.

Optionally, the outgoing communication module may include in the processed sender address information indicating the recipient or recipients of the message, in an encrypted form. Later, when the recipient replies to the processed sender address, an incoming communication module can verify that the replier is sending a message to an address he is authorized to send messages to. Optionally, the system may recognize illegitimate senders of incoming messages as spam senders, and handle such messages as spam messages.

A major concern of many email vendors may be spam messages. Generally, spam messages are unsolicited messages sent to the user or to a large group of users, usually encouraging the recipient to purchase goods or otherwise disturbing the user without invitation. Some messaging servers analyze message content in order to identify spam messages. Embodiments of the invention may thus interfere with this processing as the message content may be hidden from the messaging server. In some embodiments, an incoming communication module may perform spam identification before forwarding the message to the messaging server. The incoming communication module may apply any available spam identification technique or tools prior to forwarding the message to the messaging server. The spam identification process may herein be referred to as production of message classification information. Any processing of a message as described herein may be based on classification information produced by a classification of the message. For example, an encryption scheme may be selected based on a classification of the message. A classification of a message may be based on information included in a message (e.g., a recipient, a sender, a subject, content included in a body etc.). A classification of a message may be based on a context or any relevant parameter, e.g., a communication channel over which the message is communicated (e.g., a secured or non-secured channel), a destination server or web site and the like.

Embodiments of the invention, e.g., a mediator as described herein, may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. Some embodiments, e.g., a mediator as described herein, may be provided in a computer program product that may include a non-transitory machine-readable medium, stored thereon instructions, which may be used to program a computer, or other programmable devices, to perform methods as disclosed herein.

The storage medium may include, but is not limited to, any type of disk including optical disks, rewritable compact disk (CD-RWs) and the like. The storage medium may include semiconductor devices such as read-only memories (ROMs), random access memories (RAMs), such as a dynamic RAM (DRAM), flash memories or any type of media suitable for storing electronic instructions, including programmable storage devices. A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a workstation, a server computer, a network device or any other suitable computing device.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A system for securing messages comprising one or more computing devices of a restricted access network including:
   a computing device configured to function as a forward mediator of the restricted access network to:
      receive an original plaintext message comprising an original recipient address having an original recipient domain,
      process the original message to provide a processed message, wherein the processing includes transforming at least a portion of the original plaintext message and the recipient address and replacing the original recipient domain by appending a different domain of a reverse mediator to cause a server to route the processed message via the reverse mediator, and
      forward the at least one processed message to the server of a messaging system of a public network; and
   a computing device configured to function as a reverse mediator of the restricted access network to:
      receive a processed message from the server, and
      process the received processed message to provide an unprocessed plaintext message for forwarding to a recipient.

2. The system of claim 1, wherein said transforming at least a portion of the original message includes encrypting the portion of the original message.

3. The system of claim 1, wherein the portion is selected from the group consisting of: a sender address, a subject associated with the message, at least one attachment, at least one message header, and a body of the message.

4. The system of claim 1, wherein processing the recipient address is designed to cause the server to send the processed message to the reverse mediator.

5. The system of claim 1, wherein said original message and said unprocessed message are email messages.

6. The system of claim 1, wherein processing the original message includes classifying the original message to produce message classification information.

7. The system of claim 1, wherein:
   processing the original message to produce the processed message includes:
      generating at least one secured search term based on at least one original term included in the original message; and
      including the generated at least one secured search term in the processed message.

8. The system of claim of claim 7, wherein the processing of the original message to produce the processed message includes changing a location of an original term and said at least one secured search term.

9. The system of claim 7, wherein the processing of the original message to produce the processed message includes deterministically encrypting said at least one original search terms using a secret key or applying non-reversible keyed security transformation to at least one original search term.

10. The system of claim 1, further comprising a search mediator, said search mediator to:
    receive a first request from a client;
    generate a second request based on the first request;
    generate at least one secured search term based on at least one original search term included in the first request;

include the at least one secured search term in the second request; and forward the second request to the server.

11. The system of claim 1, wherein the processing of the original message to produce the processed message includes changing a location of at least a portion of the original message.

12. The system of claim 1, wherein the processing of the original message to produce the processed message is according to: a sender of the message or a receiver of the message.

13. The system of claim 1, wherein the forward mediator is configured to include a parameter in the processed message and, the reverse mediator is configured to validate the processed message based on the parameter.

14. The system of claim 13, wherein validating the processed message is based on at least one of: an integrity parameter and a time the original message was received by the forward mediator.

15. The system of claim 1, wherein the processing of the original message to produce the processed message includes normalizing at least one original term included in the original message and generating a secured search term based on the normalized at least one original term.

16. The system of claim 1, wherein the processing of the original message to produce the processed message includes selecting at least one original search term based on at least one of: a length of an original search term, a presence of an original search term in a set of terms, and an absence of an original search term in a set of terms.

17. The method of claim 1 comprising hiding the identity of a user by hiding the recipient address of an incoming message.

18. The method of claim 1 comprising generating a fake recipient address that is adapted to be identified as fake by the reverse mediator but not by the server.

19. The method of claim 1 comprising placing the processed recipient address in another message part selected from the group consisting of: the message body or the message subject.

20. The method of claim 1 comprising changing a location of the original recipient address to generate the processed recipient address by moving the original recipient address between an email "cc" or "bcc" recipient list and a "to" recipient list.

21. A method of securing messages in a restricted access network, the method comprising:

at a forward mediator of the restricted access network:

receiving an original plaintext message comprising an original recipient address having an original recipient domain destined to a recipient;

processing the original message to provide a processed message, wherein the processing includes transforming at least a portion of the original plaintext message and the recipient address and replacing the original recipient domain by appending a different domain of a reverse mediator to cause a server to route the processed message via the reverse mediator;

forwarding the processed message to the server of a messaging system;

at a reverse mediator of the restricted access network:

receiving the processed message from the server;

processing the received processed message to provide an unprocessed plaintext message; and forwarding the unprocessed message to the recipient.

22. The method of claim 21, wherein processing the original message includes encrypting at least a portion of the original message.

23. The method of claim 21, wherein processing the original message includes encrypting at least a portion of the original message, wherein the portion is selected from the group consisting of: a sender address, a subject associated with the message, at least one attachment, at least one message header, and a body of the message.

24. The method of claim 21, wherein processing the recipient address is designed to cause the server to send the processed message to the reverse mediator.

25. The method of claim 21, wherein said original message and said unprocessed message are email messages.

26. The method of claim 21, wherein processing the original message includes classifying the original message to produce message classification information.

27. The method of claim 21, wherein processing the original message includes generating at least one secured search term corresponding to at least one original search terms included in the original message, wherein said generating includes at least one of: normalizing at least one original search terms, selecting at least one original search term according to a length of an original search term, selecting at least one original search term according to a presence in a set of terms, encrypting at least one original search term using a secret key and applying a one-way keyed security transformation to at least one original search term.

* * * * *